Sept. 6, 1966 W. R. McAFEE 3,270,458
FISHING TACKLE
Filed Jan. 4, 1965

INVENTOR
William R. McAfee

ATTORNEYS

United States Patent Office 3,270,458
Patented Sept. 6, 1966

3,270,458
FISHING TACKLE
William R. McAfee, Rte. 1, Sanger, Tex.
Filed Jan. 4, 1965, Ser. No. 422,956
7 Claims. (Cl. 43—42.74)

This invention relates to fishing tackle and more particularly to a device for securing a plurality of hooks to a fishing line.

An object of this invention is to provide a new and improved device for securing a plurality of hooks to a fishing line in predetermined spaced relationship to prevent the hooks from entanglement with one another.

Still another object is to provide a device of the type described having means for holding the hooks in any one of a plurality of different predetermined positions relative to one another.

Still another object is to provide a device of the type described which permits the hooks to be held vertically from one another by any one of several different predetermined distances.

A further object is to provide a new and improved device for holding a sinker and a plurality of hooks in any one of several predetermined horizontal and vertical relationships relative to one another.

Another object of the invention is to provide a device of the type described having a positioning plate and a plurality of spreader wires supported by a spring clip or loop for pivotal movement relative to each other, one of the spreader wires having a weight or sinker connected thereto and two of the spreader members having hooks connected thereto by means of leaders, the positioning plate and the spreader wires being coengageable to hold the spreader wires in any one of a plurality of different angular positions about the horizontal axis relative to each other.

Still another object is to provide a connecting device of the type described wherein the hooks on the leaders may be connected to the device against displacement to facilitate handling and storage of the assembly of the device, the leaders, and the hooks when not in use.

Additional objects and advantages of the invention will be readily apparent from the reading of the following description of a device constructed in accordance with the invention, and reference to the accompanying drawings thereof, wherein:

FIGURE 2 is a reduced front view showing the hooks and sinker held in one predetermined relationship relative to one another;

FIGURE 3 is a view similar to FIGURE 2 showing the hooks and sinker held in another predetermined relationship relative to one another;

FIGURE 6 is a fragmentary enlarged sectional view of the device showing the manner in which the spreader members are partially mounted on the connector loop.

Figure 1:
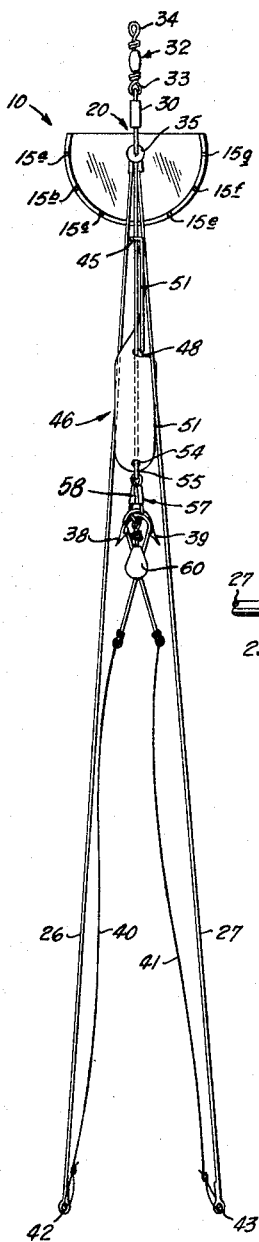
FIGURE 1 is a front view of the device showing the device in inoperative condition with the hooks secured thereto to facilitate its handling.
Figure 4:
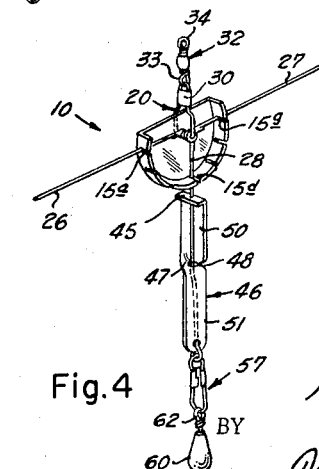
FIGURE 4 is a fragmentary enlarged perspective view of the device.
Figure 5:
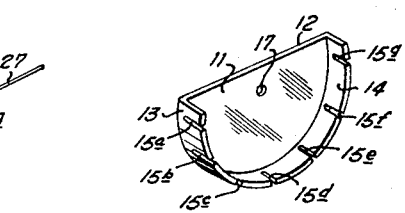
FIGURE 5 is an enlarged perspective view of the positioner plate.

Referring now to the drawings, the device 10 embodying the invention includes substantially an arcuate positioner plate 11 having a straight top edge 12 and circular peripheral side edge 13 from which a circular peripheral flange 14 extends perpendicularly forwardly of the plate 11. The flange has a plurality of slots 15a–g which are spaced at predetermined angular distances from one another about central axis of the aperture 17 of the plate. The extreme upper slots 15a and 15g lie along a diametrical line which passes through the axis of the aperture 17. The flange 14 is a section of a circle having the axis of the aperture as its center. A spring clip or loop 20 has a lower horizontal portion 21 which extends through the plate aperture 17 and through the eyes or loops 22, 23, and 24 of the relatively stiff but resilient spreader wires or members 26, 27, and 28, respectively. The spring clip is held against opening by a suitably metal retainer 30 which extends about an intermediate portion of the loop at one side thereof and about the ends of the spring clip in substantially the same manner as the well known safety pin. A conventional fishing line swivel 32 has a lower loop 33 which extends through the upper portion of the spring clip above the retainer 30 and an upper loop 34 to which the free end of the fishing line may be tied in any suitable manner.

The spring clip has a disk or stop 35 rigidly secured thereto, as by solder, to limit forward movement of the loops 22, 23, and 24 on the lower horizontal portion 21 of the loop. Rearward movement on the bottom horizontal portion 21 is, of course, limited by the engagement of the rearmost loop 22 with the forward vertical surface of the plate 11.

The stop 35 is preferably positioned in substantially the same plane as the outer edge of the flange 14, and the spreader members must be flexed resiliently forwardly to some degree to permit them to be moved out of the slots they happen to be positioned in so that the stop cooperates with the flange to releasably hold the spreader members against displacement from the slots in which they are positioned. The slots are also preferably of substantially the same width as the thickness of the spreader members so that the parallel surfaces of the flange defining the sides of the slots frictionally engage the spreader members to aid in preventing their accidental displacement from the slots.

A pair of hooks 38 and 39 are secured to the outer ends of the spreader members 26 and 27 by means of the usual leaders 40 and 41 of nylons, gut, or the like, whose upper ends are tied to the outer end loops 42 and 43 of the spreader members, respectively.

The spreader member 28, below the flange 14, extends through an aperture in the top flange 45 of a lure 46 formed of a flat strip of bright metal twisted about an intermediate narrow connector portion 47 formed by a lateral slit 48 to provide the upper and lower portions 50 and 51 extending in mutually perpendicular vertical planes. The spreader wire 28 also extends through the slit 48 and through an aperture 54 adjacent the lower end of the lower lure portion. The lower end of the spreader member 28 is bent back to form a loop 55 which extends through the upper portion of a spring clip 57 similar to the spring clip 20 and having a retainer 58. A sinker 60 is mounted on the lower portion of the spring clip 57 by means of its loop 62.

In use, the connector device 10 is connected to the lower end of a fishing line L by means of the swivel 32 and the spreader wires 26, 27, and 28 are positioned in the desired slots 15a–15g of the flange 14 to position the hooks 38 and 39 in predetermined vertical and horizontal relationships to one another. For example, if it is desired that the hooks be spaced far apart but be at the same vertical level, the spreader members 26 and 27 are positioned in the slots 15a and 15g and the spreader wire 28 is positioned in the lowermost or central slot 15d of the flange. The sinker will now hold the plate and the hooks in the position illustrated in FIGURE 2 due to the force of gravity acting thereon, the plate 11 being pivoted to the position illustrated in FIGURE 2 about the portion 21 of the spring clip by the force exerted thereon by the sinker.

If it is desired that the hooks 38 and 39 be at the same vertical level but spaced apart a shorter distance, the spreader members 26 and 27 may be positioned in the slots 15b and 15f. If it is desired that they be spaced apart a very short distance, the spreader members 26 and 27 are positioned in the slots 15c and 15e, respectively. In either of the latter two cases, the spreader member 28 is positioned in the slot 15d.

If it is desired that one of the hooks be at a higher level than the other, the wire 28 may be moved to one of the other slots, for example, the slot 15c, thus causing the disk to pivot about the portion 21 of the spring clip 20 to the position illustrated in FIGURE 3, causing the hook 38 to be at a lower elevation than the hook 39. The hook 39 may be moved to a slightly lower position but still higher than the hook 38, if desired, by moving it into the slot 15f, in which case the assembly will be in the position illustrated in FIGURE 3.

Any one of the spreader members being positionable in any one of the slots, they may be arranged in any one of a plurality of predetermined positions relative to one another. For example, the sinker spreader member 28 may be positioned in the slot 15a while the spreader members 26 and 27 may each be located in any one of the other slots 15b–15g. The lure 46 reflects light and attracts fish toward the device, and as they approach the lure the fish see the bait on the hooks 38 and 39.

When not in use the hooks 38 and 39 may be inserted through the lower portion of the spring clip 57, as illustrated in FIGURE 1. The resilient spreader members 26 and 27 flex resiliently to permit the points of the hooks to be inserted thereto whereupon the hooks are held in the position illustrated in FIGURE 1. The distance from the points of the hook to the ends of the spreader members 26 and 27 when the leaders are pulled into a straight line is somewhat shorter than the distance from the ends of the spreader member to the lower portion of the spring clip 57.

It will now be seen that a new and improved connector device has been illustrated and described for holding a plurality of fishing hooks in any one of a predetermined number of vertically and horizontally spaced positions relative to one another which includes a plate 11 and a plurality of relatively stiff resilient spreader members 26, 27, and 28 which are all mounted on a spring clip for pivotal movement about a common horizontal axis, and that the positioning plate is provided with means, such as the slots 15a–15g in its circular flange 14, in which the spreader members are receivable.

It will further be seen that hooks 38 and 39 connected to the spreader members 26 and 27 by the leaders 40 and 41, are receivable in the spring clip 57 connected to the outer spreader member 28 whereby the hooks are held secured against entanglement during handling, storage, or transportation.

It will further be seen that the plate and adjacent end of the spreader members are connected to one another by a spring clip and are individually pivotable about a common horizontal axis and that the positioning plate, which is also connected to the spreader members by the spring clip, is also pivotable about the common axis and has means for holding the spreader members in any one of a plurality of predetermined angular positions relative to each other.

It will further be seen that the position of the plate itself about the common axis is determined by a mass or sinker secured to one of the spreader members when the latter is secured to the plate.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A fishing device including: a positioning plate; a plurality of elongate spreader members; means for supporting said positioning plate and said spreader members, said supporting means permitting pivotal movement of said plate and said spreader members individually about a common horizontal axis; a sinker secured to one of said spreader members at a location spaced from said axis; and fish hooks secured to others of said spreader members at locations spaced from said axis, said positioning plate having means for releasably holding each of said spreader members in any one of several predetermined positions about said axis relative to each other and to said plate.

2. A fishing device including: a positioning plate; means supporting said positioning plate and permitting pivotal movement of said plate about a horizontal axis; a mass operatively associated with said positioning plate in any one of a plurality of adjusted positions relative thereto to hold said positioning plate in any one of a plurality of predetermined angular positions about said axis; and a plurality of spreader members extending outwardly of said positioning plate, said positioning plate having means for holding said spreader members in any one of a plurality of predetermined positions relative to said plate and said axis.

3. A positioning device including: a vertical positioning plate having an aperture; means extending through said aperture for connecting said positioning plate to a fishing line, said plate having an arcuate flange having the horizontal axis of the aperture at its center of curvature, said flange having a plurality of slots spaced predetermined angular distances from one another about said axis; a plurality of elongate spreader members each having an inner end pivotally secured to said connecting means and extending outwardly from said connecting means and outwardly of said flange of said plate, said spreader members being receivable in said slots to hold said spreader members in predetermined angular positions relative to each other and to said flange, one of said spreader members having a sinker secured to its end remote from said inner end and holding said plate in any one of several predetermined positions about said axis; and fish hooks secured by flexible means to outer ends of the others of said spreader members.

4. The positioning device of claim 3, and a lure secured to said one of said spreader members between said plate and said sinker.

5. A positioning device including: a vertical positioning plate having an aperture; means extending through said aperture for connecting said positioning plate to a fishing line, said plate having an arcuate flange having the horizontal axis of the aperture as its center of curvature; stop means on said connecting means spaced from said positioning plate, said flange having a plurality of slots spaced predetermined angular distances from one another about said axis; a plurality of elongate spreader members each having an inner end disposed between said plate and said stop means pivotally secured to said connecting means and extending from said connecting means outwardly of said flange of said plate, said spreader members being receivable in said slots to hold said spreader members in predetermined angular positions relative to each other and to said flange, one of said spreader members having a sinker secured to its end remote from its inner end and holding said plate in any one of several predetermined positions about said axis; and fish hooks secured by flexible means to the outer ends of the others of said spreader members, said spreader members being resilient, said stop means preventing displacement of said spreader members from said slots.

6. The positioning device of claim 5, and a lure secured to said one of said spreader members between said plate and said sinker.

7. A positioning device including: a vertical positioning plate having a horizontal aperture; a connector having a lower horizontal portion extending through said aperture for connecting said positioning plate to a fishing line, said plate having an arcuate flange extending perpendicularly from said plate, said arcuate flange having the axis of said aperture as its center of curvature, said flange having a plurality of slots spaced predetermined angular distances from one another about said axis; a plurality of elongate spreader members each having an inner loop disposed about said lower horizontal lower portion of said connector, said spreader members extending outwardly of said flange of said plate, said spreader members being receivable in said slots, one of said spreader members having a sinker secured to its outer end and holding said plate by gravity in any one of several predetermined positions about said lower horizontal portion of said spring clip; flexible members secured to the outer ends of the others of said spreader members; and fish hooks secured to said flexible members.

References Cited by the Examiner

UNITED STATES PATENTS 2,683,324  7/1954  Engelman _____ 43—42.74
3,067,538  12/1962  Hines _____ 43—42.74

SAMUEL KOREN, *Primary Examiner.*

D. J. LEACH, *Assistant Examiner.*